(12) United States Patent
Luo et al.

(10) Patent No.: US 12,483,085 B2
(45) Date of Patent: Nov. 25, 2025

(54) ELECTRIC MOTOR SHAFT GROUNDING APPARATUS

(71) Applicant: GM GLOBAL TECHNOLOGY OPERATIONS LLC, Detroit, MI (US)

(72) Inventors: Yilun Luo, Ann Arbor, MI (US); John Diemer, Royal Oak, MI (US); Jack M Gayney, Grosse Ile, MI (US); Patrick S Portell, Clarkston, MI (US); Sanjeev M Naik, Troy, MI (US); Azadeh Narimissa, Lake Orion, MI (US); Mohammad F Momen, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 18/339,822

(22) Filed: Jun. 22, 2023

(65) Prior Publication Data

US 2024/0429773 A1 Dec. 26, 2024

(51) Int. Cl.
*H02K 5/173* (2006.01)
*H02K 7/00* (2006.01)
*H02K 11/40* (2016.01)

(52) U.S. Cl.
CPC .......... *H02K 5/1732* (2013.01); *H02K 7/006* (2013.01); *H02K 11/40* (2016.01)

(58) Field of Classification Search
CPC ...... H02K 11/40; H02K 5/1732; H02K 7/006; H02K 7/083
See application file for complete search history.

(56) References Cited

U.S. PATENT DOCUMENTS

| | | | |
|---|---|---|---|
| 2002/0121821 A1* | 9/2002 | Ritter | H02K 11/40 310/67 R |
| 2022/0216772 A1* | 7/2022 | Wei | F16C 19/52 |
| 2022/0255407 A1* | 8/2022 | Chen | H02K 7/003 |

FOREIGN PATENT DOCUMENTS

| | | | |
|---|---|---|---|
| CN | 111342607 A * | 6/2020 | ............ H02K 11/40 |
| DE | 102019133887 A1 | 6/2021 | |
| DE | 102020114067 A1 * | 12/2021 | ............ H02K 11/40 |

OTHER PUBLICATIONS

DE-102020114067-A1, all pages (Year: 2021).*
CN-111342607-A, all pages (Year: 2020).*

* cited by examiner

*Primary Examiner* — Naishadh N Desai
(74) *Attorney, Agent, or Firm* — Ingrassia Fisher & Lorenz, LLP | IF&L

(57) ABSTRACT

An electric motor including a motor casing, a shaft having an axis of rotation, a first end and a second end, a first main bearing for rotatably supporting the shaft at the first end within the motor casing, a second main bearing for rotatably supporting the shaft at the second end within the motor casing, and a grounding bearing for conducting a bearing current between the shaft and the motor casing.

20 Claims, 4 Drawing Sheets

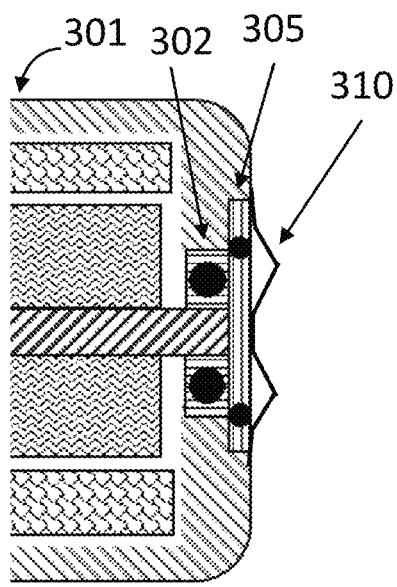 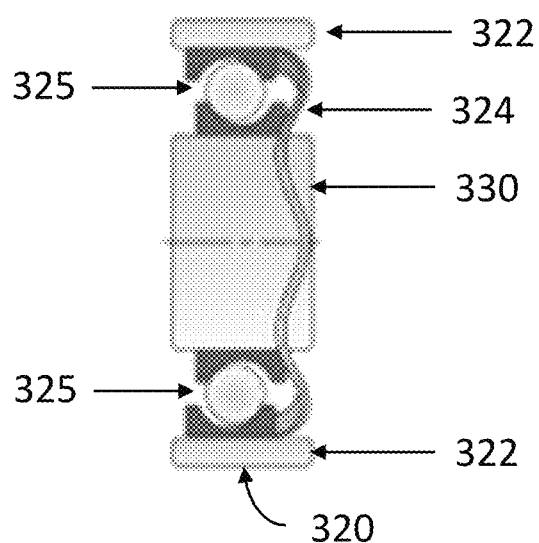
Fig. 3a
Fig. 3b
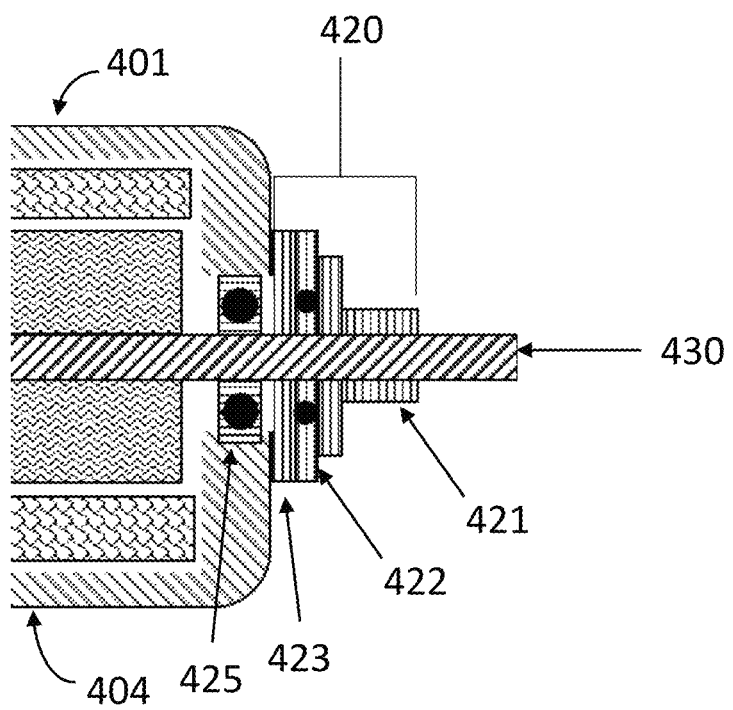
Fig. 4

ELECTRIC MOTOR SHAFT GROUNDING APPARATUS

INTRODUCTION

The present disclosure generally relates to electric motor shaft grounding systems, and more particularly relates to a method and apparatus for employing conductive bearings in an electric motor at one or more motor shaft grounding locations to improve grounding and mitigate bearing current.

Bearing current is a high-frequency current that flows through the bearings of an electric motor. Bearing current is typically caused by a current and/or voltage on the motor shaft induced by the motor windings or a power inverter which drives a discharge current through the bearings. Bearing currents and gear currents are challenging problem for electric machine systems with motors and generators, including battery, hybrid, and fuel cell electric vehicles, trains, ships, and wind turbines. These currents can cause damage to motor bearings, gear bearings, gears and their lubricants, NVH issues, gear and bearing failure, motor and gearbox failure, thereby reducing motor life and reliability and may generate costly warranty replacement claims.

Bearing current can cause damage to the bearings in a number of ways. The current flowing through the bearings creates heat, which can cause the bearings to overheat and fail. The heat can cause the lubricant in the bearings to break down, which can lead to increased friction and wear. The heat can also cause the bearing materials to expand, which can put stress on the bearing and lead to premature failure. The current flowing through the bearings can cause the bearing surfaces to erode. This flow of electrons between bearing ball and bearing carriers through the lubricant film creates a discharge current, which can erode the bearing surfaces.

Contact between bearing ball and carrier is of nano or micro size, leading to very high current density. In addition, shaft voltage build up cause excessive electric field to break down the oil film between the bearing ball and carrier, causing electrical discharge machining (EDM) effect, creating nano or micro craters on the surface. Bearing current can also cause fluting on the bearing race surfaces which can cause the bearings to vibrate. The vibration is caused by the current flowing through the bearings creating a magnetic field, which can accelerate the wear of the bearings and lead to premature motor failure. In addition to the direct damage caused by bearing currents, bearing currents can also indirectly damage the motor by causing the motor to overheat, which can damage the motor windings and other components.

It is desirable to overcome the aforementioned problems in order to provide systems for bearing current mitigation in electric motors, gearbox and drive units. Furthermore, other desirable features and characteristics of the present invention will become apparent from the subsequent detailed description and the appended claims, taken in conjunction with the accompanying drawings and the foregoing technical field and background.

SUMMARY

Disclosed herein are electric propulsion methods and systems and related electrical systems for provisioning motor systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for the mitigation of electrical motor bearing damage and wear resulting from bearing currents induced by electric motors and electric motor power supply systems.

In accordance with an aspect of the present disclosure, an electric motor including a bearing current mitigation system to reduce electric motor bearing wear. In accordance with an aspect of the present disclosure, the electric motor includes a motor casing, a shaft having an axis of rotation, a first end and a second end, a first main bearing for rotatably supporting the shaft at the first end within the motor casing, a second main bearing for rotatably supporting the shaft at the second end within the motor casing, and a grounding device, i.e. bearing, sliding clip, brush, or, rotary device filled with conductive fluid for conducting a bearing current between the shaft and the motor casing.

In accordance with another aspect of the present disclosure, wherein the grounding bearing further includes a spring preload for applying a force between an outer bearing ring and an inner bearing ring along the axis of rotation.

In accordance with another aspect of the present disclosure, wherein the grounding bearing has fewer rolling elements than the second main bearing.

In accordance with another aspect of the present disclosure, wherein the grounding bearing includes a conductive lubricant and the second main bearing includes a dielectric lubricant.

In accordance with another aspect of the present disclosure, wherein the grounding device is a thrust bearing, sliding clip or a brush.

In accordance with another aspect of the present disclosure, wherein an electrical impedance of the second main bearing is greater than an electrical impedance of the grounding bearing.

In accordance with another aspect of the present disclosure, wherein the grounding bearing is installed adjacent to the second main bearing with an inner bearing ring conductively coupled to the shaft and an outer bearing ring conductively coupled to the motor casing.

In accordance with another aspect of the present disclosure, wherein the shaft includes a cooling channel running along the axis of rotation within the shaft and wherein the grounding device is installed within the cooling channel with an outer bearing ring conductively coupled to the shaft and an inner bearing ring conductively coupled to a cooling tube.

In accordance with another aspect of the present disclosure, wherein the grounding bearing includes an inner bearing ring conductively coupled to the shaft and an outer bearing ring conductively coupled to the motor casing via at least one of a Litz wire and a conductive spring.

In accordance with another aspect of the present disclosure, an apparatus including an electric motor having a motor shaft rotatably supported within a motor casing by a first main bearing and a second main bearing, a gearbox having a gear case and a load shaft wherein the gearbox is coupled to the electric motor via the motor shaft, the motor shaft being rotativity supported within the gear case by a first gearbox bearing and wherein the load shaft is rotativity supported within the gear case by a second gearbox bearing, and a grounding bearing for conducting an alternating current between the load shaft and the gear case.

In accordance with another aspect of the present disclosure, wherein the load shaft is conductively coupled to the motor shaft via a plurality of electrically conductive gears.

In accordance with another aspect of the present disclosure, wherein the electric motor is a single phase electric motor, or a multi-phase electric motor.

In accordance with another aspect of the present disclosure, wherein the grounding bearing is positioned adjacent to the second gearbox bearing and wherein the grounding bearing has a smaller rotational radius than the second gearbox bearing.

In accordance with another aspect of the present disclosure, wherein the load shaft is configured to drive a load and wherein the load is a wheel assembly.

In accordance with another aspect of the present disclosure, wherein the gear case is conductively coupled to the motor casing.

In accordance with another aspect of the present disclosure, wherein the grounding bearing has fewer rolling elements than the second gearbox bearing.

In accordance with another aspect of the present disclosure, wherein the grounding bearing has larger total contact area than the motor bearing, or second gearbox bearing.

In accordance with another aspect of the present disclosure, wherein the load shaft has a lower rotational speed than the motor shaft.

In accordance with another aspect of the present disclosure, wherein the grounding device is a thrust bearing, sliding clip or a brush.

In accordance with another aspect of the present disclosure, a vehicle propulsion system including a battery for providing a direct current, an inverter for converting the direct current to a three phase alternating current, an electric motor for rotating a motor shaft in response to the three phase alternating current, the electric motor further including a motor casing a first main bearing for rotatably supporting the motor shaft at a load end within the motor casing, a second main bearing for rotatably supporting the motor shaft at a non-load end within the motor casing, a grounding bearing installed adjacent to the second main bearing for conducting a bearing current between the motor shaft and the motor casing, and a gearbox mechanically coupled to the motor shaft.

In accordance with another aspect of the present disclosure, a brush or grounding bearing installed adjacent to each of the main bearings to bypass the circulating bearing current and grounding the shaft voltage to eliminate the EDM bearing current.

In accordance with another aspect of the present disclosure, wherein the grounding bearing includes a conductive lubricant and fewer rolling elements than the second main bearing and wherein the grounding bearing has a smaller rotational radius than the second main bearing.

BRIEF DESCRIPTION OF THE DRAWINGS

The exemplary embodiments will hereinafter be described in conjunction with the following drawing figures, wherein like numerals denote like elements, and wherein:

FIG. 3a shows an exemplary configuration for electric motor bearing current mitigation using a preloaded grounding bearing in accordance with various embodiments;

FIG. 3b shows a cross section of a preloaded grounding bearing for use in electric motor bearing current mitigation in accordance with various embodiments;

FIG. 4 shows an exemplary configuration for electric motor bearing current mitigation using a thrust bearing or thrust brush as a grounding bearing in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Bearing currents can be generated by magnetic fields generated during normal operation of an electric motor and can be coupled to the motor shaft via capacitive or inductive coupling. The motor bearings supporting the motor shaft can then act as capacitors and the voltage on the motor shaft can induce a current in the bearings. Capacitive coupling is the transfer of energy between two conductors that are separated by an insulator. Capacitive coupling works by creating an electric field between two conductors. This electric field then induces a current in the other conductor. The amount of current induced is proportional to the strength of the electric field and the capacitance between the two conductors. There are a number of factors that can affect the efficiency of capacitive coupling, including the distance between the conductors, the area of the conductors, and the dielectric constant of the insulator between the conductors.

Inductive coupling is the transfer of energy between two or more conductors through a magnetic field. The windings of the electric motor can produce a magnetic field, and this field can induce a current in the bearings. Inductive coupling works by creating a magnetic field around one conductor. This magnetic field then induces a voltage in another conductor that is located within the field. The amount of voltage induced is proportional to the strength of the magnetic field and the distance between the two conductors. There are a number of factors that can affect the efficiency of inductive coupling, including the size and shape of the conductors, the distance between the conductors, and the permeability of the material between the conductors.

Figure 1:
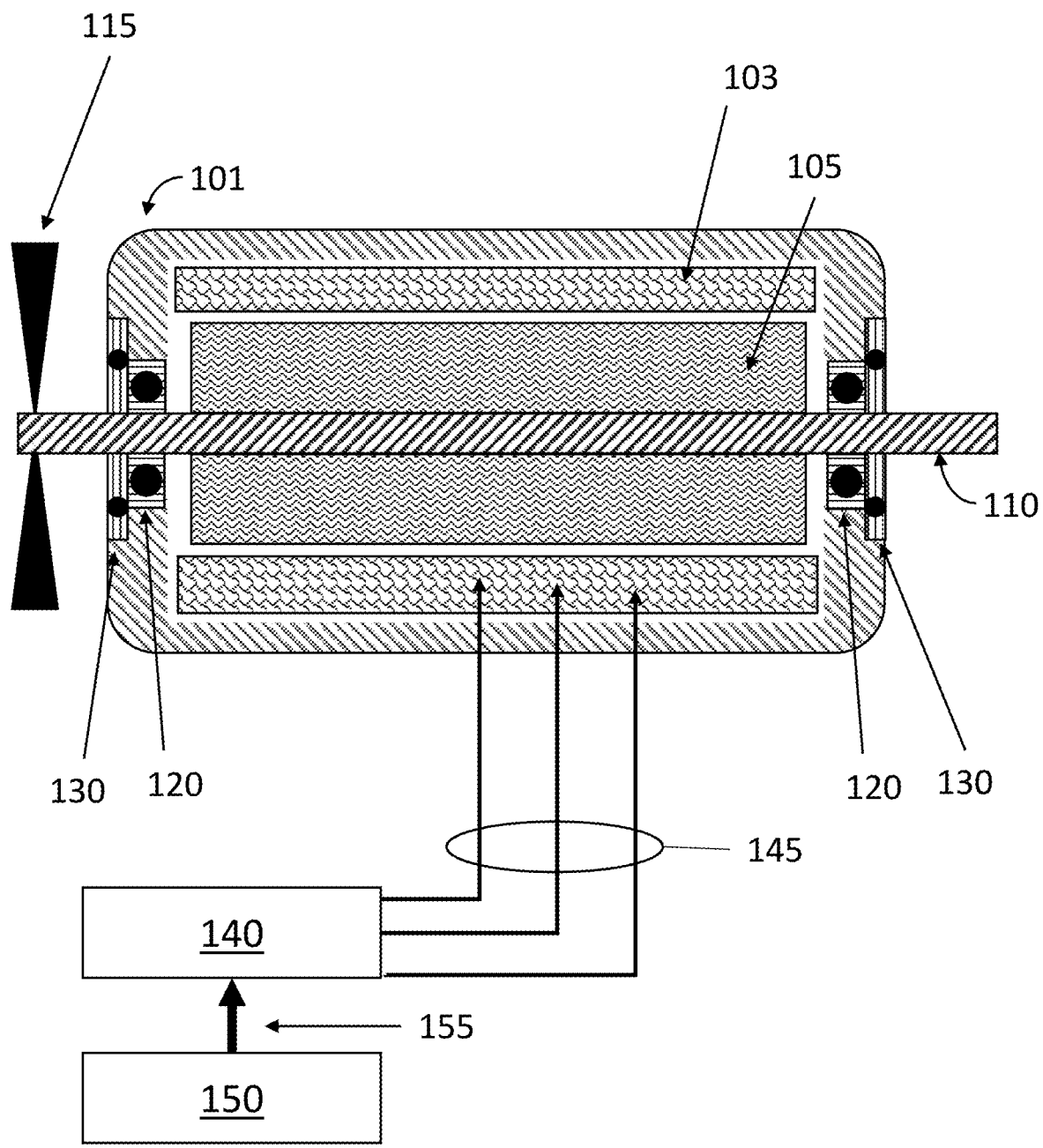
FIG. 1 shows an exemplary three-phase AC induction motor including associated motor shaft grounding in accordance with various embodiments.

Turning now to FIG. 1, an exemplary three-phase AC induction motor 100 including associated motor shaft grounding according to an exemplary embodiment is shown. The exemplary motor 100 includes a motor casing 101, a stator 103, a rotor 105, a motor shaft 110, a fan 115, a main bearing 120, a grounding bearing 130, an inverter 140, a three phase electrical power cable 145, a direct current (DC) power supply 150, and a DC electrical power cable 155.

A three-phase AC induction motor 100 is an electric motor that uses three-phase alternating current (AC) to power it. Three-phase AC induction motors are used in a variety of applications, including electric vehicles, airplanes, ships, pumps, wind turbines, fans, and conveyor belts. A three-phase AC induction motor 100 has two main parts: the stator 103 and the rotor 105. The stator 103 is the stationary part of the motor and is mechanically coupled to the motor casing 101. The rotor 105 is the rotating part of the motor 100 and is mechanically coupled to the motor shaft 110. In some exemplary embodiments, the stator 103 has three coils that are arranged in a triangle shape. The coils are connected to a three-phase AC supplied by the three separate conductors of the three phase electrical power cable 145. When the three phase AC is applied to the coils, it creates a rotating magnetic field.

The rotor 105 can include a series of metal bars that are connected by short-circuited rings. The rotating magnetic field from the stator 103 induces a current in the rotor bars. This current creates a magnetic field in the rotor 105 that opposes the magnetic field generated by the stator 103. The interaction between the magnetic field generated by the stator 103 and the magnetic field of the rotor 105 causes the rotor 105 to rotate. The speed of the rotor 105 is determined by the frequency of the three phase AC and the number of poles in the stator 103.

DC power is supplied to the exemplary electric motor 100 by a DC power supply 150. In some exemplary embodiments, the DC power supply 150 can be a lithium ion battery pack of an electric vehicle, delivering a DC voltage to the inverter 140 via the DC power cable 155. The inverter 140 is operative to convert the DC voltage 155 to a three phase AC.

A three-phase AC inverter 140 is a power electronic device that converts a DC input voltage to a three-phase AC output voltage. It is used in a variety of applications, including motor drives, power supplies, and welding equipment. The basic principle of operation of a three-phase AC inverter 140 is to use a series of switches to turn the DC input voltage on and off in a controlled manner. The switches can be arranged in a three-phase bridge configuration, with each switch connected to one of the three phases of the AC output voltage. The switching of the switches is typically controlled by a microcontroller or other digital controller. The switches in the inverter are typically semiconductor devices, such as transistors or thyristors. The controller uses a feedback signal from the AC output voltage to determine when to turn each switch on and off. This ensures that the AC output voltage has the desired frequency, amplitude, and phase angle. In some exemplary embodiments, the inverter 140 can be an H-bridge inverter or a cascaded inverter.

A problem that exists with a three phase AC inverter 140 is that the switching of high DC voltages can result in common mode voltage transients being introduced onto all of the lines of the three-phase electrical power cable. This common mode voltage transient can be of higher frequency, high voltage, and high switching slew rate. This common mode voltage transient can generate a common mode current in the motor, which can be coupled between the stator 130 and the rotor 105 to the motor shaft 110 and is discharged across the motor bearings to the motor casing 101 and eventually to ground. This electrical discharge across the motor bearings can cause the bearings to overheat and wear prematurely.

To address this problem, a motor bearing configuration is used employing conductive devices i.e. bearings, brushes, grounding spring, sliding clip, rotary device filled with conductive fluids, having at least one grounding bearing 130 in addition to the main bearings 120 to achieve better performance and reliability with lower cost and loss. The grounding bearing 130 can be positioned alongside the main bearing 120 to better mitigate bearing current to protect motor bearings, gears and gear bearings. The grounding bearing 130 can be of lower load rating than the main bearing 120 and can be installed on non-driving or driving end side of the motor shaft 110, either end of the motor shaft 110 or a gear shaft, reducing the conductive bearing's speed to reduce its electrical impedance, in or on the shaft, or directly on cooling tubes to reduce cost and improve cooling. The proposed configurations minimize the overall bearing electrical impedance to better mitigate EDM bearing current and circulating bearing currents by taking advantage of skin effect by installing the conductive bearing on the outer surface of the shaft plus forming a shorter current path, using conductive lubricant, and less viscous lubricant and/or bearing preloading reducing oil film thickness, and increasing contact area in the bearing to reduce electrical impedance. Skin effect is a tendency for alternating current to flow mostly near the outer surface of an electrical conductor, such as metal wire or shaft. The effect becomes more and more apparent as the frequency increases.

Various configurations of main bearing 120 and grounding bearing 130 and electric motor configurations are disclosed such that the grounding bearing electrical impedance is lower than the main bearing electrical impedance. This difference in impedance can be achieved using conductive or less-viscous oil, adding preloading, reducing oil film thickness, and increasing contact area. A smaller AC choke can be added on the apparatus, to directly filter the bearing current, more effective than using a choke on the motor cable to filter the larger common mode current flowing there. Carbon stick and brush are effective at grounding but may wear relatively quickly. The new apparatus provides more reliable grounding with lower electrical impedance (Ze) and frication to better mitigate the EDM bearing current and bypass the circulating bearing current.

The grounding bearing 130 can be configured to have fewer rolling elements than the main bearing 120, thereby having lower resistance at the point of the rolling element. More rolling elements result in a more even distribution of force on the bearing and a more even distribution of lubricant, thereby more effectively evening the resistance over the bearing. Less rolling elements results in an uneven distribution of forces and uneven distribution of lubricant, thereby resulting in at least one path with a lower resistance than the others. This path of least resistance would be the preferred path for any electrical discharge, thereby increasing the wear and/or damage on the grounding bearing 130 and reducing any damage on the motor bearings 130.

The grounding bearing 130 can use a conductive or dielectric lubricant to decrease impedance and the main bearing 120 can use an insulative lubricant to increase impedance. To reduce electrical impedance the grounding bearing may use a thinner or less-viscous lubricant to reduce the bearings oil film thickness, and thereby lowering the impedance, of the grounding bearing lubricant. In addition the grounding bearing can employ rolling elements with a smaller rotational radius than the rolling elements employed by the main bearings or by making the grounding bearing inner bearing ring smaller. A less-viscous lubricant can be used for the grounding bearing 130 in order to reduce a distance between the rolling elements and the bearing rings thereby reducing an impedance of the grounding bearing 130. In some exemplary embodiments, an oil scraping tip/ring/spring can be added in front of the tip, or bearing rolling element to minimize oil thickness, and thus reduce preloading to optimize wear and conductivity. The bearing element contact area can be increased to reduce impedance by increasing the number of rolling elements, or using bearings with increased contact area, such as roller bearings, needle bearings or thrust bearings. Reducing the bearing radius of the grounding bearing 130 compared to the main bearing 120 can reduce the rotational speed of the grounding bearing compared to that of the main bearing 120 thereby allowing for a less viscous or thinner lubricant and/or fewer rolling elements thereby lowering the impedance of the grounding bearing 130. In addition, an AC choke can be added to the grounding bearing 130 as opposed to adding the AC chock to the three phase electrical power cable 145 to filter bearing current as the bearing current at the grounding bearing 130 can be up to 20 times smaller than the total common mode current at the three phase electrical power cable 145.

Figure 2:
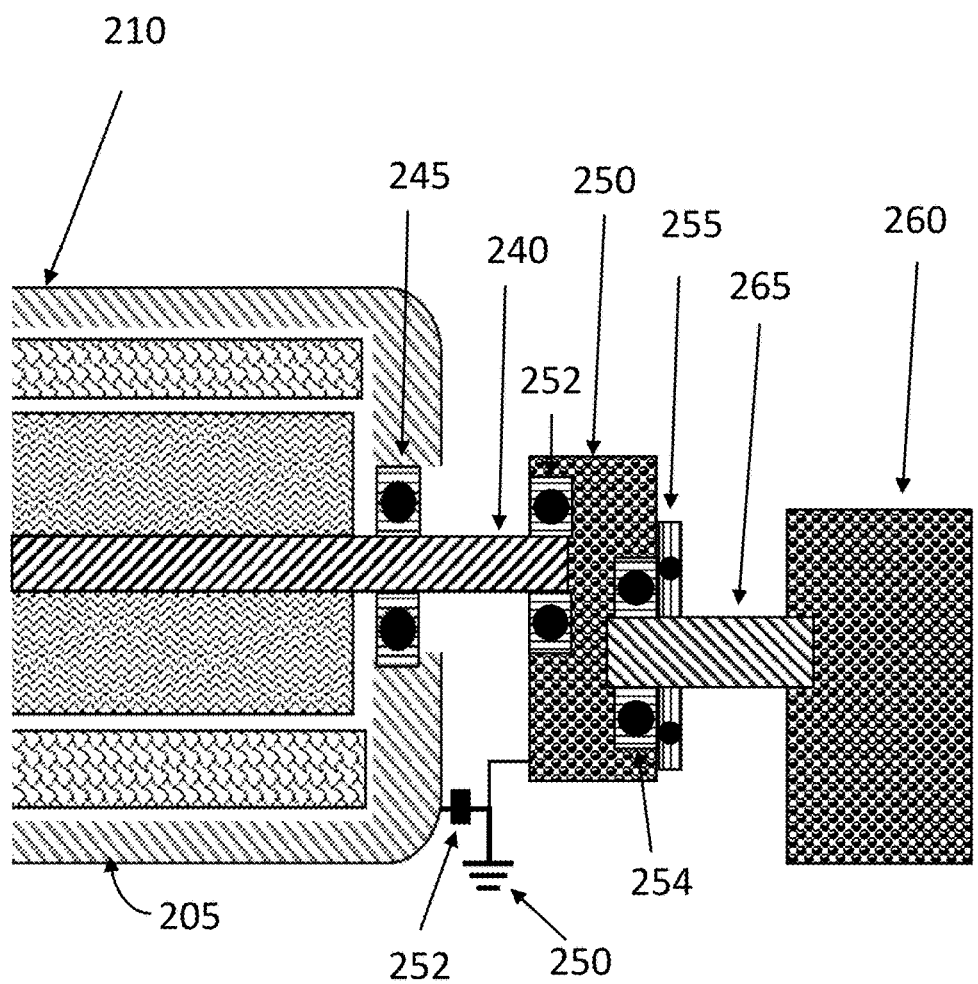
FIG. 2 shows an exemplary configuration for electric motor bearing current mitigation using a gear case and load shaft grounding in accordance with various embodiments.

Turning now to FIG. 2, an exemplary configuration 200 for electric motor bearing current mitigation using a gear case and load shaft grounding according to an exemplary embodiment is shown. The exemplary configuration 200 includes a three-phase AC induction motor 210 having a motor casing 205, a main bearing 245, a motor shaft 240, a gear case 250, a grounding bearing 255, a load 260 and a load shaft 265.

In some exemplary configurations, the load shaft 265 may rotate at a lower revolution speed than the main motor shaft 240. The reduction in rotational speed can result from a gearing ratio of gears within the gear case 250. This reduction in rotational speed can result in reduced bearing wear, particularly in the case wear less lubrication is employed in the bearing. In some exemplary embodiments, the grounding bearing 255 can be positioned on a load shaft 265, being at a slower bearing rotational speed, to reduce its oil film thickness, providing a smaller Ze ground path for motor shaft currents. The load shaft 265 is operative to drive a load 260, such as a wheel, differential, transmission, transfer case, or any other load.

In some exemplary embodiments, electrical currents can be induced on the motor shaft 240 due to inductive mode or common mode coupling of electrical noise/leakage current generated during operation of the three-phase AC induction motor 210. To avoid damage to the main bearing 245 of the three-phase AC induction motor 210 due to bearing currents, the exemplary configuration 200 can be arranged such that the inducted leakage current is coupled from the motor shaft 240 to the load shaft 265 via conductive gears within the gear case 250. A motor side main bearing 252 is positioned on the motor side of the gear case 250 to support the motor shaft 240. The grounding bearing 255 is positioned along with a load side main bearing 254 to support the load shaft 265 on the load side of the gear case 250. Since the rotational speed of the load shaft 265 is lower than that of the motor shaft 240, wear on the grounding bearing 255 is reduced. This reduction in excess wear and heat can allow for use of a thinner lubricant, lower number of rolling elements, and/or preloading of the grounding bearing 255 to reduce the grounding bearing impedance. In addition, the radius at the junction between the inner portion of the grounding bearing 255 and the outer portion of the grounding bearing 255 can be selected to further reduce the angular speed at the junction, thereby reducing wear and reducing heat on the grounding bearing 255. In some exemplary embodiments, an RF choke 252 or other RF impedance can be placed in series with a grounding point 250 of the motor casing 205 such that the RF impedance to the grounding point 250 via the gear case 250 is lower than the RF impedance between the motor casing 205 and the grounding point 250. This can improve the effectiveness of the grounding bearing 255 which can be electrically coupled to the gear case 250 and reduce damage to the main bearing 245 of the three-phase AC induction motor 210.

Turning now to FIG. 3a, an exemplary configuration for electric motor bearing current mitigation using a preloaded grounding bearing according to an exemplary embodiment is shown. Bearing preload is the process of applying a force to the bearing that is not caused by an external load. This force can be applied either direction axially, along the axis of the shaft, or radially, perpendicular to the axis of the shaft. The bearing can be preloaded using a spring preload where a spring is placed between the bearing and the housing or shaft or a solid preload using a spacer or other solid device to force the bearing together.

In some exemplary embodiments, an electric motor 301 is configured with a main motor shaft bearing 302 and a preloaded grounding bearing 305. The preloading of the grounding bearing 305 can maintain a thin and optimal oil film to compensate for changes in the bearing spacing due to load, shock, vibration, or displacement. In some exemplary embodiments, the preloading of the grounding bearing 305 is achieved using a spring preload 310 to apply bearing preloading in the opposite direction of a loading/fluting zone of the main bearing 302 to compensate for oil film thickness changes due to load or road shock. Advantageously, reduced lubricant thickness and constant rolling element contact and pressure decreases the impedance between the grounding bearing housing and shaft thereby improving bearing current discharge across the grounding bearing 305. FIG. 3b is illustrative of a cross section of a preloaded grounding bearing 320 having a bearing housing 322, a bearing shaft 330 and a spring preload 324. The spring preload 324 is configured to maintain a positive pressure on the rolling element 325 by the bearing housing 322 and the bearing shaft 330.

Turning now to FIG. 4, an exemplary configuration 200 for electric motor bearing current mitigation using a thrust bearing or thrust brush grounding configuration according to an exemplary embodiment is shown. A thrust bearing 420 is a type of bearing that supports axial loads, or loads that are parallel to a shaft, such as a motor shaft 430 in an electric motor 401. The thrust bearing 420 can include a bearing shaft 421 which is mechanically affixed to the motor shaft 430 and rotates with the motor shaft 430, rolling elements within a cage 423 and a housing which is mechanically affixed to the electric motor casing 404. The thrust bearing 420 can be either preloaded or not preloaded, lubricated or unlubricated. Since the thrust bearing 420 does not provide support for the motor shaft 430, the thrust bearing 420 can experience less mechanical stress and therefore can use a thinner or less viscous lubricant, or no lubricant, to improve conductivity of the thrust bearing 420 to bearing currents between the motor shaft 430 and the motor casing 404. The thrust bearing 420 can be installed external to the motor casing 404 or internal to the motor casing 404. In some exemplary embodiments, the thrust bearing 420 can be installed on the load end of the motor shaft 430 or on the non-load end of the motor shaft 430. The thrust bearing is configured as a low impedance electrical grounding path between the motor shaft 430 and the motor casing 404.

Figure 5:
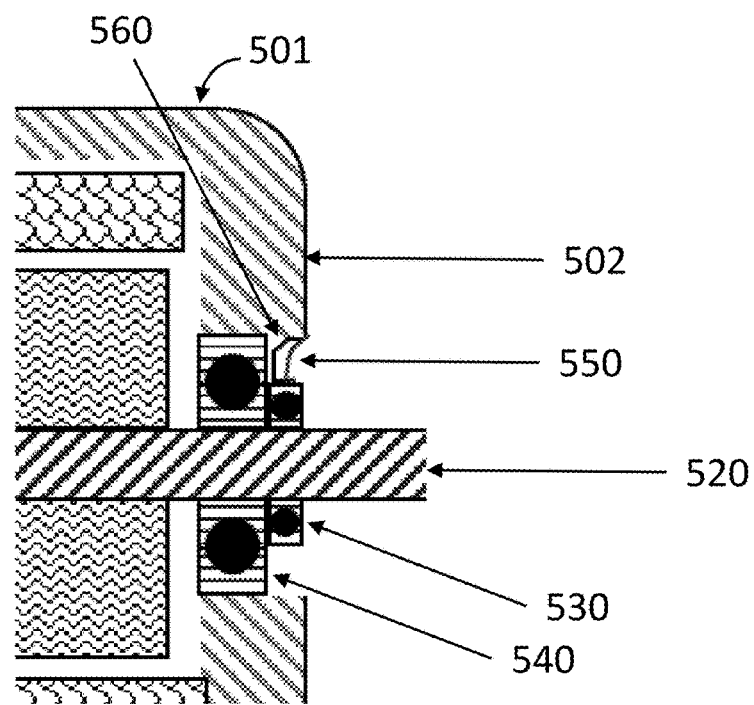
FIG. 5 shows an exemplary configuration for electric motor bearing current mitigation using a grounding bearing. Litz wire, and grounding spring in accordance with various embodiments.

Turning now to FIG. 5, an exemplary configuration for electric motor bearing current mitigation using a grounding bearing 530 according to an exemplary embodiment is shown. The exemplary configuration uses a grounding bearing 530, a Litz wire 550, a grounding hook 560, a main bearing 540, a motor shaft 520, and an electric motor 501 with a motor casing 502. In some exemplary embodiments, the grounding hook 560 can be a grounding spring, such as a copper spring finger or the like.

The Litz wire 550 can be a multistrand wire or cable used to carry AC current at radio frequencies. The Litz wire 550 is configured to reduce RF impedance caused by skin effect and proximity effect losses in electrical conductors. In addition, one or more grounding hooks 560 can be used to compensate for displacement/load variations between the motor shaft 520 and the motor casing 502 to ensure a low impedance. The grounding hook 560 can include one or more semirigid conductive members, such as beryllium copper fingers, metal brushes or the like, to maintain a positive pressure between the grounding bearing 530 and the motor casing 502. In some exemplary embodiments, the grounding hook 560 can be one or more metal brushes with wear-resistant tips to electrically couple the grounding bearing 530 to the motor casing 502 with or without the grounding bearing 530.

Figure 6:
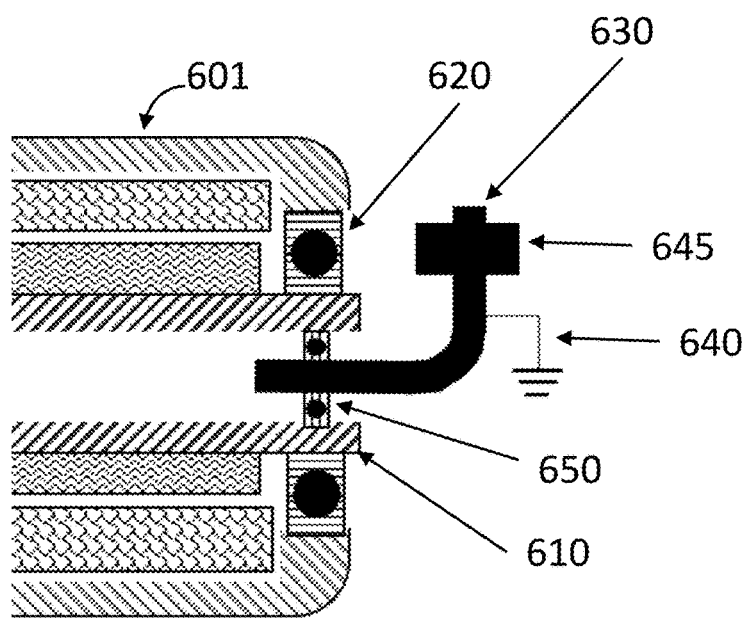
FIG. 6 shows an exemplary configuration for electric motor bearing current mitigation using a cooling tube grounding bearing configuration in accordance with various embodiments.

Turning now to FIG. 6, an exemplary configuration for electric motor bearing current mitigation using a cooling tube grounding bearing 650 configuration according to an exemplary embodiment is shown. The exemplary configuration can include an electric motor 601, a main bearing 620, a cooling tube 630, an electric ground point 640, a cooling tube grounding bearing 650 and a motor shaft 610.

Cooling tubes are used in electric motors to dissipate heat generated by the electric motor's rotor, windings and bearings. The tubes are typically made of copper or aluminum, and they can be filled with a coolant, such as water, oil, or a compressed gas such as air. The coolant is circulated through the tubes by a pump, and it absorbs the heat from the motor. The heated coolant can then be cooled by a radiator or heat exchanger in the case of a liquid coolant, and it is circulated back through the electric motor 601. One way to cool an electric motor rotor and motor shaft 610 is to provide a hollow motor shaft 610 and to run the coolant through the hollow portion of the motor shaft 610. The coolant tube 630 must then have a smaller diameter than the hollow portion of the motor shaft 610. To provide a grounding path for unwanted bearing currents, a cooling tube grounding bearing 650 can be added between the outside surface of the cooling tube 630 and the inner surface of the hollow portion of the motor shaft 610. This cooling tube grounding bearing 650 would have a small radius and therefore a lower angular rotational speed than the outside of the motor shaft 610. In addition, the cooling tube grounding bearing 650 would be carrying little or none of the electric motor load and would therefore experience less load wear. The cooling tube grounding bearing 650 can use a conductive lubricant and conductive rolling elements to create a low impedance electrical connection between the inside of the motor shaft 610 and the cooling tube 630. In some exemplary embodiments, the cooling tube can be electrically coupled to a grounding point 640 for coupling electrical current to a vehicle chassis or other grounding point. In addition, an electrical choke 645 can be affixed to a portion of the cooling tube 630 after the grounding point 640 to provide an increased impedance to any remaining electrical current such that the remaining electrical current is coupled to the grounding point 640.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle propulsion system comprising:
a battery for providing a direct current, wherein the battery includes a lithium ion battery pack;
an inverter, coupled to the battery, for converting the direct current to an alternating current;
an electric motor for rotating a motor shaft in response to the alternating current, the electric motor further including a motor casing, a first main bearing for rotatably supporting the motor shaft at a load end within the motor casing, a second main bearing for rotatably supporting the motor shaft at a non-load end within the motor casing, and a grounding bearing installed adjacent to the second main bearing for conducting a bearing current between the motor shaft and the motor casing; and
a gearbox mechanically coupled to the motor shaft.

2. The vehicle propulsion system of claim 1 wherein the grounding bearing further includes a spring preload for applying a force between an outer bearing ring and an inner bearing ring along an axis of rotation.

3. The vehicle propulsion system of claim 1 wherein the grounding bearing has fewer rolling elements than the second main bearing.

4. The vehicle propulsion system of claim 1 wherein the grounding bearing includes a conductive lubricant and the second main bearing includes a dielectric lubricant.

5. The vehicle propulsion system of claim 1 wherein the grounding bearing is at least one of a thrust bearing, a grounding spring, a sliding clip and a thrust brush.

6. The vehicle propulsion system of claim 1 wherein an electrical impedance of the second main bearing is greater than an electrical impedance of the grounding bearing.

7. The vehicle propulsion system of claim 1 wherein the grounding bearing is installed adjacent to the second main bearing with an inner bearing ring conductively coupled to the motor shaft and an outer bearing ring conductively coupled to the motor casing.

8. The vehicle propulsion system of claim 1 wherein the motor shaft includes a cooling channel running along an axis of rotation within the motor shaft and wherein at least one of the grounding bearing, a grounding brush and a grounding spring is installed within the cooling channel with an outer bearing ring conductively coupled to the motor shaft and an inner bearing ring conductively coupled to a cooling tube.

9. The vehicle propulsion system of claim 1 wherein the grounding bearing includes an inner bearing ring conductively coupled to the motor shaft and an outer bearing ring conductively coupled to the motor casing via at least one of a Litz wire and a conductive spring.

10. A vehicle propulsion system comprising;
a battery for providing a direct current;

an inverter for converting the direct current to an alternating current, wherein the inverter includes a plurality of switches arranged in a three-phase bridge configuration;

an electric motor for rotating a motor shaft in response to the alternating current, the electric motor further including a motor casing, a first main bearing for rotatably supporting the motor shaft at a load end within the motor casing, a second main bearing for rotatably supporting the motor shaft at a non-load end within the motor casing, and a grounding bearing installed adjacent to the second main bearing for conducting a bearing current between the motor shaft and the motor casing; and a gearbox mechanically coupled to the motor shaft.

11. The vehicle propulsion system of claim 10 wherein the gearbox further includes a gear case and a load shaft wherein the gearbox is coupled to the electric motor via the motor shaft, the motor shaft being rotativity supported within the gear case by a first gearbox bearing and wherein the load shaft is rotativity supported within the gear case by a second gearbox bearing wherein the load shaft is conductively coupled to the motor shaft via a plurality of electrically conductive gears.

12. The vehicle propulsion system of claim 11 wherein the grounding bearing is positioned adjacent to the second gearbox bearing and wherein the grounding bearing has a smaller rotational radius than the second gearbox bearing.

13. The vehicle propulsion system of claim 11 wherein the gear case is conductively coupled to the motor casing.

14. The vehicle propulsion system of claim 11 wherein the grounding bearing has fewer rolling elements than the second gearbox bearing.

15. The vehicle propulsion system of claim 11 wherein the load shaft has a lower rotational speed than the motor shaft.

16. The vehicle propulsion system of claim 11 wherein the grounding bearing is one of a thrust bearing, a grounding spring, a sliding clip and a thrust brush.

17. The vehicle propulsion system of claim 11 wherein the grounding bearing has a larger total contact area than each of the motor bearing and the second gearbox bearing.

18. The vehicle propulsion system of claim 11 wherein at least one of a brush and a grounding bearing are installed adjacent to each of the first main bearing and the second main bearing to bypass bearing currents and grounding the motor shaft to eliminate an electrical discharge machining bearing current.

19. A vehicle propulsion system comprising:

a battery for providing a direct current;

an inverter for converting the direct current to an alternating current;

an electric motor for rotating a motor shaft in response to the alternating current, the electric motor further including a motor casing, a first main bearing for rotatably supporting the motor shaft at a load end within the motor casing, a second main bearing for rotatably supporting the motor shaft at a non-load end within the motor casing, and a grounding bearing installed adjacent to the second main bearing for conducting a bearing current between the motor shaft and the motor casing; and a gearbox mechanically coupled to the motor shaft.

20. The vehicle propulsion system of claim 19, wherein the grounding bearing includes a conductive lubricant and fewer rolling elements than the second main bearing and wherein the grounding bearing has a smaller rotational radius than the second main bearing.

* * * * *